(12) United States Patent
Maeda et al.

(10) Patent No.: US 8,449,664 B2
(45) Date of Patent: May 28, 2013

(54) WATER-BASED INK FOR INK-JET RECORDING, INK CARTRIDGE, AND INK-JET RECORDING APPARATUS

(75) Inventors: Mitsunori Maeda, Nagoya (JP); Kazuma Goto, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 322 days.

(21) Appl. No.: 12/888,784

(22) Filed: Sep. 23, 2010

(65) Prior Publication Data

US 2011/0128332 A1 Jun. 2, 2011

(30) Foreign Application Priority Data

Nov. 30, 2009 (JP) ................. 2009-272390
Nov. 30, 2009 (JP) ................. 2009-272391
Nov. 30, 2009 (JP) ................. 2009-272392
Nov. 30, 2009 (JP) ................. 2009-272393

(51) Int. Cl.
  *C09D 11/02* (2006.01)
(52) U.S. Cl.
  USPC ................. 106/31.47; 106/31.48
(58) Field of Classification Search
  USPC ............... 106/31.47, 31.48; 347/100
  See application file for complete search history.

(56) References Cited

U.S. PATENT DOCUMENTS

| | | | |
|---|---|---|---|
| 5,367,075 A * | 11/1994 | Nakamatsu et al. ........... 546/76 |
| 5,599,386 A | 2/1997 | Sano et al. | |
| 5,609,673 A | 3/1997 | Takimoto et al. | |
| 5,795,375 A | 8/1998 | Yamazaki et al. | |
| 6,365,720 B1 | 4/2002 | Schacht et al. | |
| 6,444,807 B1 | 9/2002 | Wolleb et al. | |
| 6,488,751 B1 | 12/2002 | Takemoto | |
| 6,495,250 B1 | 12/2002 | Schacht et al. | |
| 7,270,701 B2 | 9/2007 | Jinnou et al. | |
| 7,303,618 B1 | 12/2007 | Taga et al. | |
| 7,425,233 B2 | 9/2008 | Hamajima et al. | |
| 7,476,270 B2 * | 1/2009 | McGorrin ................. 106/31.47 |
| 7,566,362 B2 | 7/2009 | Mori et al. | |
| 7,585,361 B2 | 9/2009 | Yoneda et al. | |
| 7,591,888 B2 | 9/2009 | Fujii et al. | |
| 7,611,571 B2 | 11/2009 | Yamashita et al. | |
| 7,632,344 B2 * | 12/2009 | McGorrin ................. 106/31.47 |
| 7,674,329 B2 * | 3/2010 | Koga et al. ................ 106/31.59 |
| 7,713,343 B2 * | 5/2010 | Goto et al. ................ 106/31.48 |
| 7,727,321 B2 * | 6/2010 | Goto et al. ................ 106/31.48 |
| 7,854,797 B2 | 12/2010 | Fujii et al. | |
| 7,871,464 B2 * | 1/2011 | Ono et al. ................. 106/31.47 |
| 8,226,222 B2 | 7/2012 | Kajiura et al. | |
| 2003/0105321 A1 | 6/2003 | Wolleb et al. | |
| 2004/0089200 A1 | 5/2004 | Fujiwara et al. | |
| 2004/0122219 A1 | 6/2004 | Fujiwara et al. | |
| 2005/0057629 A1 | 3/2005 | Taguchi et al. | |
| 2005/0104944 A1 | 5/2005 | Robertson et al. | |
| 2005/0115458 A1 | 6/2005 | Oki et al. | |
| 2005/0115459 A1 | 6/2005 | Hanmura et al. | |
| 2005/0215773 A1 | 9/2005 | Tateishi et al. | |
| 2006/0016026 A1 | 1/2006 | Tateishi et al. | |
| 2006/0156951 A1 | 7/2006 | Patel | |
| 2007/0173641 A1 | 7/2007 | Fujiwara et al. | |
| 2007/0263055 A1 | 11/2007 | Kitamura et al. | |
| 2008/0241398 A1 | 10/2008 | Kato et al. | |
| 2008/0274284 A1 * | 11/2008 | Fujimoto et al. ........... 106/31.47 |
| 2008/0274286 A1 | 11/2008 | Yamashita et al. | |
| 2009/0000511 A1 | 1/2009 | Kitamura et al. | |
| 2009/0029120 A1 | 1/2009 | Fujii et al. | |
| 2009/0151599 A1 | 6/2009 | Fujii et al. | |
| 2009/0202798 A1 | 8/2009 | Patel | |
| 2010/0112218 A1 | 5/2010 | Fujii et al. | |
| 2010/0209678 A1 * | 8/2010 | Ono et al. ................. 428/195.1 |
| 2010/0251933 A1 * | 10/2010 | Dodge et al. ............. 106/31.48 |
| 2011/0032302 A1 * | 2/2011 | Kajiura et al. ............ 106/31.47 |
| 2011/0128331 A1 | 6/2011 | Hayashida et al. | |
| 2011/0128332 A1 | 6/2011 | Maeda et al. | |
| 2011/0128333 A1 * | 6/2011 | Goto et al. ................ 106/31.48 |
| 2012/0081453 A1 * | 4/2012 | Tsuzaka et al. ........... 106/31.48 |
| 2012/0081454 A1 | 4/2012 | Ito et al. | |

FOREIGN PATENT DOCUMENTS

| | | |
|---|---|---|
| EP | 1985668 A1 | 10/2008 |
| EP | 1988134 A2 | 11/2008 |
| EP | 2017309 A1 | 1/2009 |
| EP | 2128202 A1 | 12/2009 |
| EP | 2206747 | 7/2010 |
| JP | 03-103484 A | 4/1991 |

| | | |
|---|---|---|
| JP | 07-278478 | 10/1995 |
| JP | 08-073791 | 3/1996 |
| JP | 08-311375 | 11/1996 |
| JP | 09-137098 | 5/1997 |
| JP | 09-202043 | 8/1997 |
| JP | 09-235484 | 9/1997 |
| JP | 09-241555 | 9/1997 |
| JP | 2000-178491 A | 6/2000 |
| JP | 2000-265099 | 9/2000 |
| JP | 2000-303009 A | 10/2000 |
| JP | 2002-526589 A | 8/2002 |
| JP | 2002-371079 | 12/2002 |
| JP | 2002-371214 | 12/2002 |
| JP | 2003-213168 A | 7/2003 |
| JP | 2003-231823 | 8/2003 |
| JP | 2004-002670 A | 1/2004 |
| JP | 2005-075778 A | 3/2005 |
| JP | 2005-520029 A | 7/2005 |
| JP | 2006-503148 A | 1/2006 |
| JP | 2006-028450 A | 2/2006 |
| JP | 2007-277416 A | 10/2007 |
| JP | 2008-013706 A | 1/2008 |
| JP | 2008/202011 * | 9/2008 |
| JP | 2008-246821 | 10/2008 |
| JP | 2009-057540 A | 3/2009 |
| WO | 2007091631 A1 | 8/2007 |
| WO | 2007144586 A2 | 12/2007 |
| WO | 2008111635 A1 | 9/2008 |
| WO | 2009/054829 A1 | 4/2009 |
| WO | 2009-060654 | 5/2009 |
| WO | WO 2009/119656 A1 * | 10/2009 |

OTHER PUBLICATIONS

Extended EP Search Report dtd Mar. 15, 2011, EP app. 10252011.1-2102.

Extended European search report for application No. 10252010.3 mailed Mar. 4, 2011.

Extended European search report for application No. 10252012.9 mailed Mar. 16, 2011.

* cited by examiner

*Primary Examiner* — Helene Klemanski

(74) *Attorney, Agent, or Firm* — Banner & Witcoff, Ltd.

(57) ABSTRACT

A water-based ink for ink-jet recording includes a coloring agent, water, and a water-soluble organic solvent. The coloring agent includes the following a dye (1) and a dye (2).

dye (1): a dye represented by the general formula (1)
dye (2): at least one dye selected from the group consisting of dyes represented by the general formula (2a), dyes represented by the general formula (2b), C. I. Acid Red 1, and C. I. Acid Red 254.

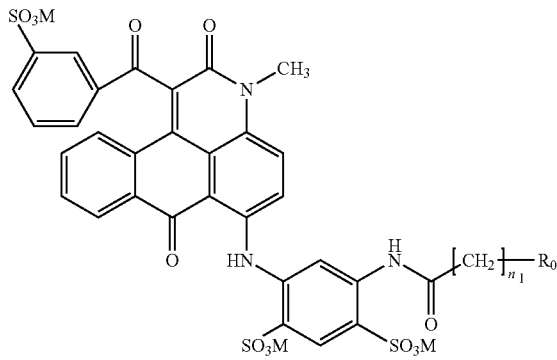

(1)

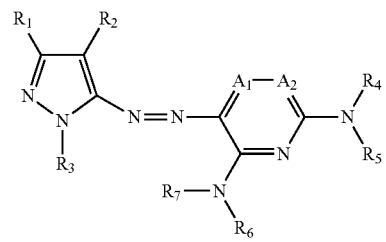

(2a)

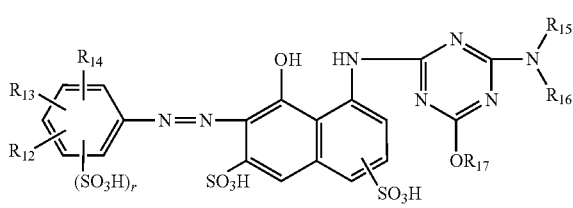

(2b)

10 Claims, 1 Drawing Sheet

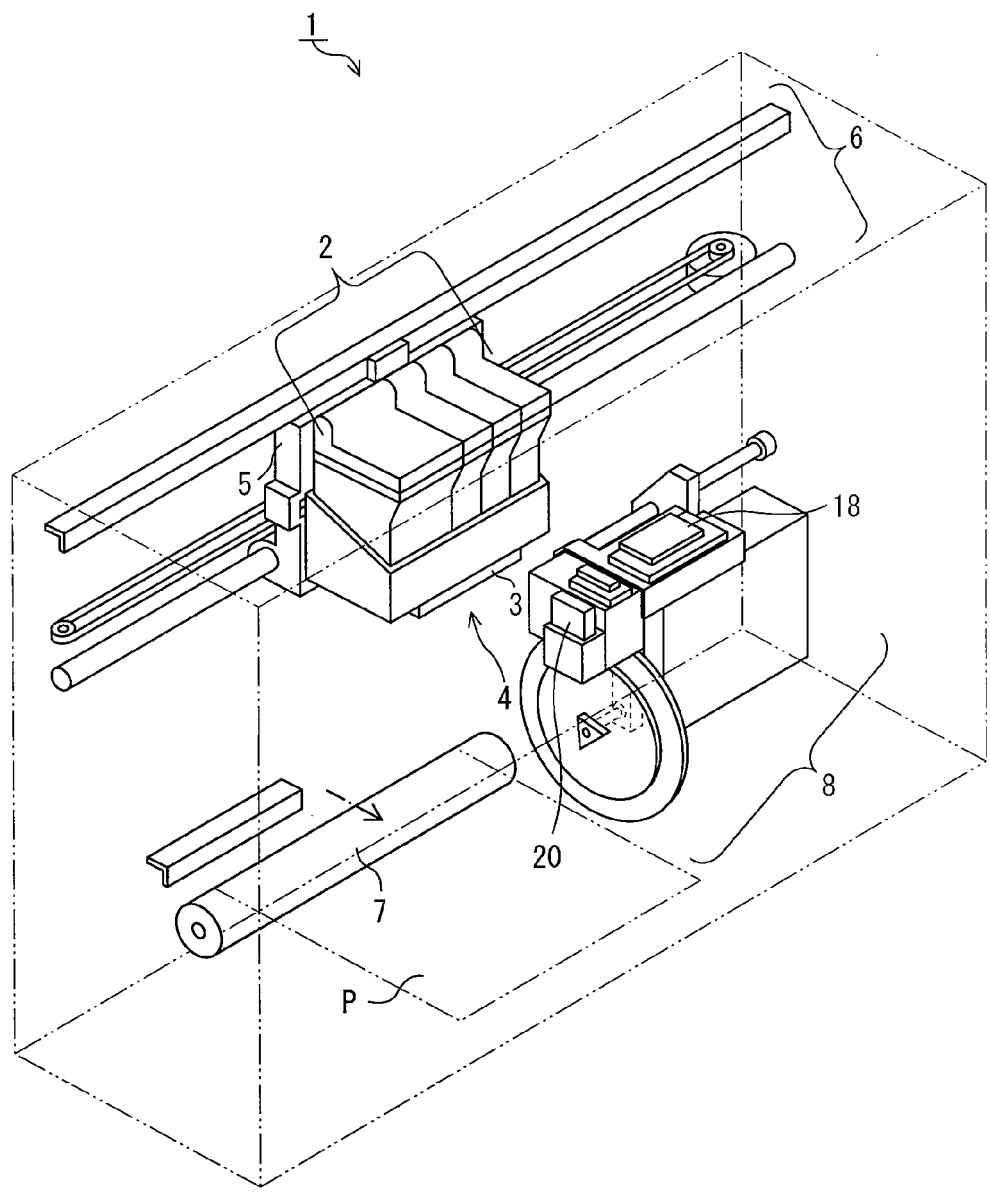

WATER-BASED INK FOR INK-JET RECORDING, INK CARTRIDGE, AND INK-JET RECORDING APPARATUS

CROSS-REFERENCE TO RELATED APPLICATION

This application claims priority from Japanese Patent Application Nos. 2009-272390, 2009-272391, 2009-272392, and 2009-272393 filed on Nov. 30, 2009. The entire subject matter of the Japanese Patent Applications is incorporated herein by reference.

BACKGROUND

As magenta inks for ink-jet recording, inks containing magenta dyes such as C. I. Acid Red 52, C. I. Acid Red 289, and the like that have higher color developing properties have been known. However, these magenta dyes do not have sufficient ozone resistance and light resistance.

SUMMARY

A water-based ink for ink-jet recording comprises a coloring agent, water, and a water-soluble organic solvent. The coloring agent comprises the following a dye (1) and a dye (2).
dye (1): a dye represented by the general formula (1)
dye (2): at least one dye selected from the group consisting of dyes represented by the general formula (2a), dyes represented by the general formula (2b), C. I. Acid Red 1, and C. I. Acid Red 254

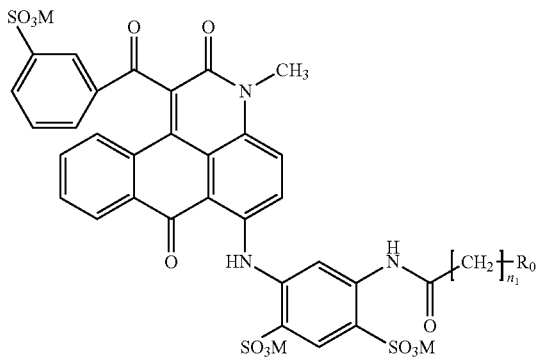

(1)

In the general formula (1),
$n_1$ is 1 or 2;
three Ms each represent sodium or ammonium, and the three Ms may be identical to or different from each other; and
$R_0$ represents a monoalkylamino group having 1 to 8 carbon atoms substituted by a carboxy group.

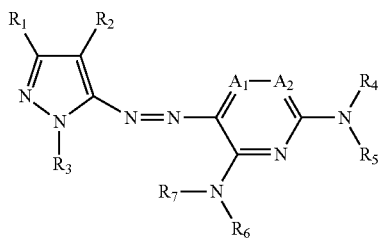

(2a)

In the general formula (2a),
$R_1$ represents a hydrogen atom, a substituted or unsubstituted alkyl group, or a substituted or unsubstituted aryl group;
$R_2$ represents a hydrogen atom, a halogen atom, or a cyano group;
$R_3$ represents a hydrogen atom, a substituted or unsubstituted alkyl group, a substituted or unsubstituted aryl group, or a substituted or unsubstituted heterocyclic group;
$R_4$, $R_5$, $R_6$, and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_4$, $R_5$, $R_6$, and $R_7$ may be identical to or different from each other, $R_4$ and $R_5$ are not both hydrogen atoms, and $R_6$ and $R_7$ are not both hydrogen atoms; and
$A_1$ and $A_2$ are both substituted or unsubstituted carbon atoms, or one of $A_1$ and $A_2$ is a substituted or unsubstituted carbon atom and the other is a nitrogen atom.

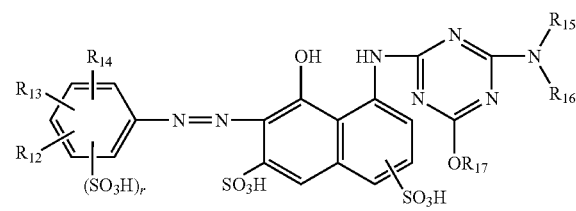

(2b)

In the general formula (2b),
r is 0, 1, or 2;
$R_{12}$, $R_{13}$, and $R_{14}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxy group, or a carboxylate ester group, and $R_{12}$, $R_{13}$, and $R_{14}$ may be identical to or different from each other; and
$R_{15}$, $R_{16}$, and $R_{17}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and $R_5$, $R_6$, and $R_7$ may be identical to or different from each other.

An ink cartridge comprises the water-based ink for ink-jet recording.

An ink-jet recording apparatus comprises an ink storing portion and an ink ejecting unit. An ink stored in the ink storing portion is ejected by the ink ejecting unit. The ink cartridge is stored in the ink storing portion.

BRIEF DESCRIPTION OF THE DRAWING

FIG. 1 is a schematic perspective view showing an example of the configuration of the ink-jet recording apparatus.

DETAILED DESCRIPTION

The water-based ink for ink-jet recording (hereinafter, this may also be referred to simply as the "water-based ink" or "ink") is described. The water-based ink comprises a coloring agent, water, and a water-soluble organic solvent. As described above, the coloring agent contains the dye (1) and the dye (2).

As described above, the dye (1) is a dye represented by the general formula (1).

As described above, in the general formula (1), $n_1$ is 1 or 2;

three Ms each represent sodium or ammonium, and the three Ms may be identical to or different from each other; and $R_0$ represents a monoalkylamino group having 1 to 8 carbon atoms substituted by a carboxy group.

A compound represented by the general formula (1) may be a compound in which all of the three Ms are sodium (sodium salts), a compound in which all of the three Ms are ammonium (ammonium salts), or a compound in which one or two of the three Ms are sodium and the other(s) is(are) ammonium. The dye (1) may be composed of one of the aforementioned compounds or may be a mixture containing two or more of the aforementioned compounds. M may be ionized in a water-based ink (may become at least one of $Na^+$ and $NH_4^+$).

Examples of the dye (1) include compounds represented by the dyes (1-A) to (1-E) shown in Table 1.

TABLE 1

|  | $n_1$ | M | $R_0$ |
|---|---|---|---|
| Dye (1-A) | 1 | Mixture of Na and $NH_4$ | —$NHCH_2COOH$ |
| Dye (1-B) | 1 | Mixture of Na and $NH_4$ | —$NH(CH_2)_5COOH$ |
| Dye (1-C) | 1 | Mixture of Na and $NH_4$ | —$NH(CH_2)_7COOH$ |
| Dye (1-D) | 2 | Mixture of Na and $NH_4$ | —$NHCH_2COOH$ |
| Dye (1-E) | 2 | Mixture of Na and $NH_4$ | —$NH(CH_2)_5COOH$ |

The dye (1) may be produced according to a conventionally known method. An example of the method for producing the dye (1) is as follows.

That is, first, a compound represented by the structural formula (12) is obtained by reaction of about 1 mol of an anthraquinone compound represented by the structural formula (11) and about 1.1 mol to about 3 mol of benzoic acetic acid ethyl ester in a polar solvent such as xylene or the like in the presence of a basic compound such as sodium carbonate or the like at a temperature from about 130° C. to about 180° C. for about 5 hours to about 15 hours.

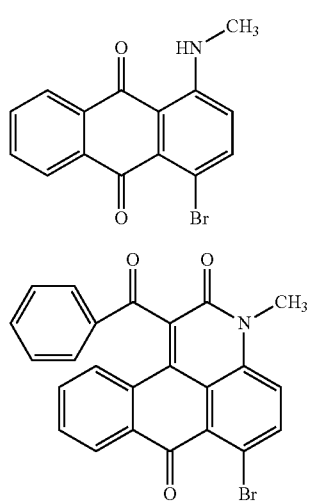

(11)

(12)

Next, about 1 mol of the compound represented by the structural formula (12) obtained as above and about 1 mol to about 5 mol of meta aminoacetamido were condensed by the Ullmann reaction in an aprotic polar organic solvent such as N,N-dimethylformamide or the like in the presence of a base such as sodium carbonate or the like and a copper catalyst such as copper acetate or the like at a temperature from about 110° C. to about 150° C. for about 2 hours to about 6 hours, and thereby a compound represented by the structural formula (13) is obtained.

(13)

Then, a compound represented by the structural formula (14) is obtained by performing sulfonation of the compound represented by the structural formula (13) obtained as above in fuming sulfuric acid of about 8% to about 15% at a temperature from about 50° C. to about 120° C. and performing hydrolysis reaction of an acetylamino group simultaneously.

(14)

Then, a compound represented by the structural formula (16) is obtained by reaction of about 1 mol of the compound represented by the structural formula (14) obtained as above and about 2 mol to about 2.5 mol of a compound represented by the structural formula (15) in water under reaction conditions in which the pH is from about 2 to about 9, the temperature is from about 2° C. to about 15° C., and the reaction time is from about 30 minutes to about 1 hour. The compound represented by the structural formula (16) obtained as above is reacted with about 2 mol to about 5 mol of a compound corresponding to $R_0$ (i.e., a compound represented by "$R_0$—H" or the like) under reaction conditions in which the pH is from about 7 to about 10, the temperature is from about 20° C. to about 90° C., and the reaction time is from about 10 minutes to about 10 hours. Thereby, a leaving group X in the structural formula (16) is substituted by $R_0$ and thus the dye (1) is obtained.

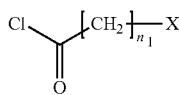

(15)

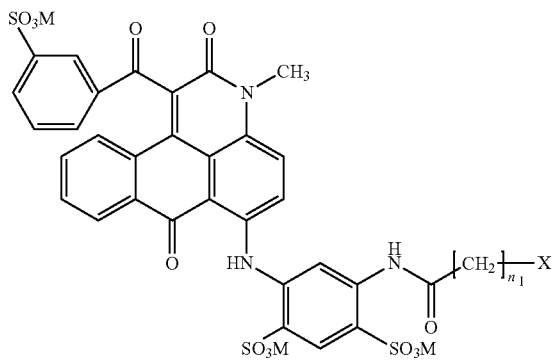

(16)

The amount of the dye (1) to be added is not particularly limited. By adding the dye (1) to the water-based ink, ejection stability, ozone resistance, and light resistance may be improved. When the dye (2) is the dye represented by the general formula (2a), the amount of the dye (1) to be added relative to the amount of the water-based ink is, for example, about 0.1 wt % to about 10 wt %, about 0.4 wt % to about 3.6 wt %, and about 0.8 wt % to about 3.0 wt %. When the dye (2) is at least one dye selected from the group consisting of the dyes represented by the general formula (2b), C.I. Acid Red 1, and C.I. Acid Red 254, the amount of the dye (1) to be added relative to the amount of the water-based ink is, for example, about 0.1 wt % to about 10 wt %, about 1.4 wt % to about 5.4 wt %, and about 1.6 wt % to about 4.8 wt %.

As described above, the dye (2) is at least one dye selected from the group consisting of dyes represented by the general formula (2a), dyes represented by the general formula (2b), C. I. Acid Red 1, and C. I. Acid Red 254.

As described above, in the general formula (2a), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_4$, $R_5$, $R_6$, and $R_7$ may be identical to or different from each other, $R_4$ and $R_5$ are not both hydrogen atoms, and $R_6$ and $R_7$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (2a), the substituted or unsubstituted alkyl group may be an alkyl group having 1 to 6 carbon atoms. Examples of the substituted or unsubstituted alkyl group include a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. Examples of a substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (2a), the substituted or unsubstituted aryl group may be an aryl group having 6 to 12 carbon atoms. However, in the case of the substituted aryl group, the number of carbon atoms does not include the number of carbon atoms of its substituent(s). Examples of the substituted or unsubstituted aryl group include a phenyl group, a naphthyl group, a p-tolyl group, a p-octylphenyl group, a mesityl group, a p-methoxyphenyl group, an o-chlorophenyl group, an m-(3-sulfopropylamino)phenyl group, and the like. Examples of a substituent of the substituted aryl group include an alkyl group such as a methyl group, an ethyl group, an isopropyl group, a tert-butyl group, a n-octyl group, or the like; the same alkoxy group as described above; the same halogen atom as described above; an alkylamino group such as a methylamino group, a dimethylamino group, or the like; an amide group; a carbamoyl group; a sulfamoyl group; a sulfoamide group; a hydroxyl group; an ester group such as a methoxycarbonyl group, an ethoxycarbonyl group, or the like; the same ionic hydrophilic group as described above; and the like.

In the general formula (2a), examples of the halogen atom include a fluorine atom, a chlorine atom, a bromine atom, an iodine atom, and the like.

In the general formula (2a), the substituted or unsubstituted heterocyclic group may be a 5- or 6-membered heterocyclic group. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. Examples of a substituent of the substituted heterocyclic group include an amide group, a carbamoyl group, a sulfamoyl group, a sulfoamide group, a hydroxyl group, the same ester group as described above, the same ionic hydrophilic group as described above and the like.

In the general formula (2a), examples of the substituted or unsubstituted sulfonyl group include a methylsulfonyl group, a phenylsulfonyl group, and the like. Examples of a substituent of the substituted sulfonyl group include the same substituted or unsubstituted alkyl group as described above, the same substituted or unsubstituted aryl group as described above, and the like.

In the general formula (2a), the substituted or unsubstituted acyl group may be an acyl group having 1 to 12 carbon atoms. However, in the case of the substituted acyl group, the number of carbon atoms does not include the number of carbon atoms of its substituent(s). Examples of the substituted or unsubstituted acyl group include an acetyl group, a benzoyl group, a chloroacetyl group, and the like. Examples of a substituent of the substituted acyl group include the same ionic hydrophilic group as described above and the like.

As described above, in the general formula (2a), $A_1$ and $A_2$ are both substituted or unsubstituted carbon atoms, or one of $A_1$ and $A_2$ is a substituted or unsubstituted carbon atom and the other is a nitrogen atom. When $A_1$ and $A_2$ are both carbon atoms, better performance may be obtained. Examples of a substituent bonded to the carbon atoms $A_1$ and $A_2$ include an alkyl group having 1 to 3 carbon atoms, a carboxy group, a carbamoyl group, a cyano group, and the like.

As described above, in the general formula (2a), $R_4$ and $R_5$ are not both hydrogen atoms and $R_6$ and $R_7$ are not both hydrogen atoms. Moreover, in the general formula (2a), the water solubility of the dye tends to be improved as the number of substitutions by a sulfonic acid group or a carboxy group is increased. Therefore, the number of these substitutions may be adjusted in accordance with need.

One embodiment of the dye represented by the general formula (2a) is an embodiment where, for example, in the general formula (2a), $R_1$ is an alkyl group; $R_2$ is a cyano group; $R_3$ is a hydrogen atom, or a substituted or unsubstituted heterocyclic group; $R_4$ is a hydrogen atom, a substituted or unsubstituted heterocyclic group, or a substituted aryl group; $R_5$ and $R_6$ each are a substituted heterocyclic group, or a substituted aryl group; $R_7$ is a hydrogen atom; $A_1$ is a substituted carbon atom; and $A_2$ is a substituted or unsubstituted carbon atom.

Another embodiment of the dye represented by the general formula (2a) is an embodiment where, for example, in the general formula (2a), $R_1$ is a tert-butyl group; $R_2$ is a cyano group; $R_3$ is a hydrogen atom, or a benzothiazolyl group (for example, a benzothiazole-2-yl group) optionally substituted by a sulfonic acid group or an alkali metal sulfonate group; $R_4$ is a hydrogen atom, a benzothiazolyl group (for example, a benzothiazole-2-yl group) optionally substituted by a sulfonic acid group or an alkali metal sulfonate group, or a trialkylphenyl group (for example, a mesityl group) substituted by a sulfonic acid group or an alkali metal sulfonate group; $R_5$ and $R_6$ each are a monoalkylphenyl group, a dialkylphenyl group, or a trialkylphenyl group (for example, a p-octylphenyl group or a mesityl group) optionally substituted by a sulfonic acid group or an alkali metal sulfonate group, or a benzothiazolyl group (for example, a benzothiazole-2-yl group) substituted by a sulfonic acid group or an alkali metal sulfonate group; $R_7$ is a hydrogen atom; $A_1$ is a substituted carbon atom; and $A_2$ is a carbon atom optionally substituted by a cyano group.

Examples of the dye represented by the general formula (2a) include compounds represented by the following chemical formulae (2a-A) to (2a-F).

(2a-A)

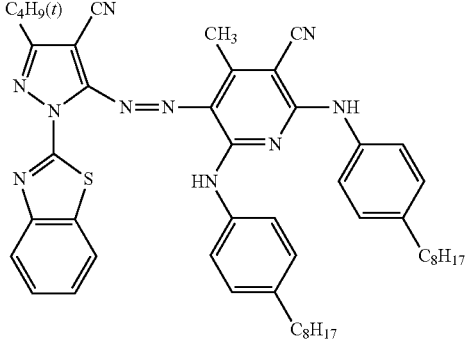

The compound represented by the chemical formula (2a-A) is an embodiment, where in the general formula (2a), $R_1$ is a tert-butyl group; $R_2$ is a cyano group; $R_3$ is a benzothiazole-2-yl group; $R_4$ is a hydrogen atom; $R_5$ and $R_6$ each are a p-octylphenyl group; $R_7$ is a hydrogen atom; $A_1$ is a carbon atom substituted by a methyl group; and $A_2$ is a carbon atom substituted by a cyano group.

(2a-B)

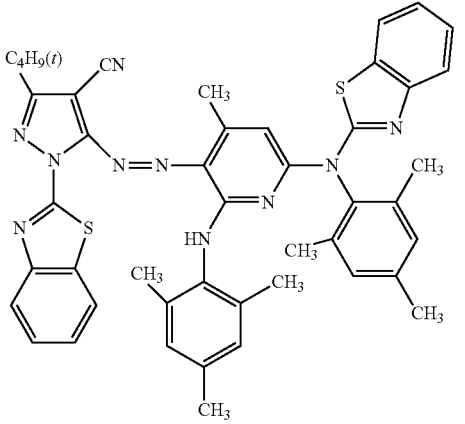

The compound represented by the chemical formula (2a-B) is another embodiment, where in the general formula (2a), $R_1$ is a tert-butyl group; $R_2$ is a cyano group; $R_3$ and $R_4$ each are a benzothiazole-2-yl group; $R_5$ and $R_6$ each are a mesityl group; $R_7$ is a hydrogen atom; $A_1$ is a carbon atom substituted by a methyl group; and $A_2$ is a carbon atom.

(2a-C)

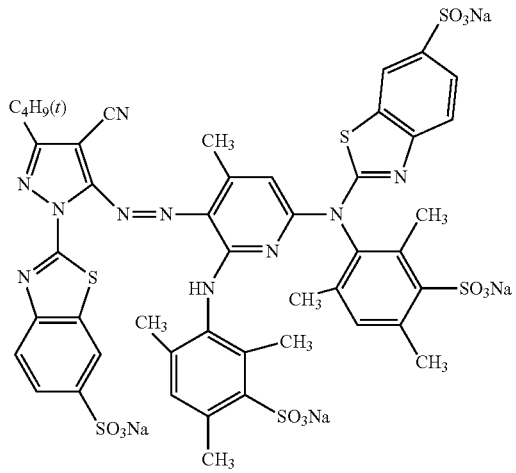

The compound represented by the chemical formula (2a-C) is still another embodiment, where in the general formula (2a), $R_1$ is a tert-butyl group; $R_2$ is a cyano group; $R_3$ and $R_4$ each are a 6-sodium sulfonate benzothiazole-2-yl group; $R_5$ and $R_6$ each are a 3-sodium sulfonate mesityl group; $R_7$ is a hydrogen atom; $A_1$ is a carbon atom substituted by a methyl group; and $A_2$ is a carbon atom.

(2a-D)

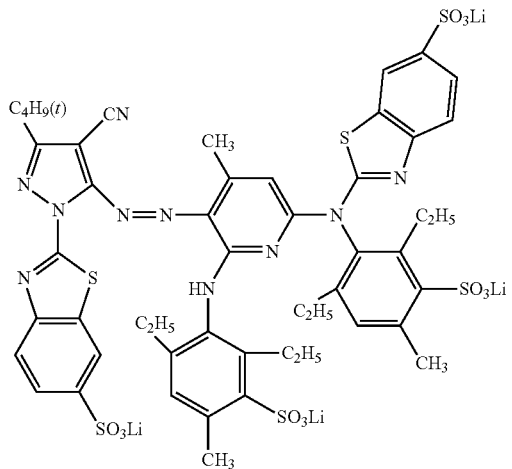

The compound represented by the chemical formula (2a-D) is yet another embodiment, where in the general formula (2a), $R_1$ is a tert-butyl group; $R_2$ is a cyano group; $R_3$ and $R_4$ each are a 6-lithium sulfonate benzothiazole-2-yl group; $R_5$ and $R_6$ each are a 2,6-diethyl-4-methyl-3-lithium sulfonate phenyl group, $R_7$ is a hydrogen atom; $A_1$ is a carbon atom substituted by a methyl group; and $A_2$ is a carbon atom.

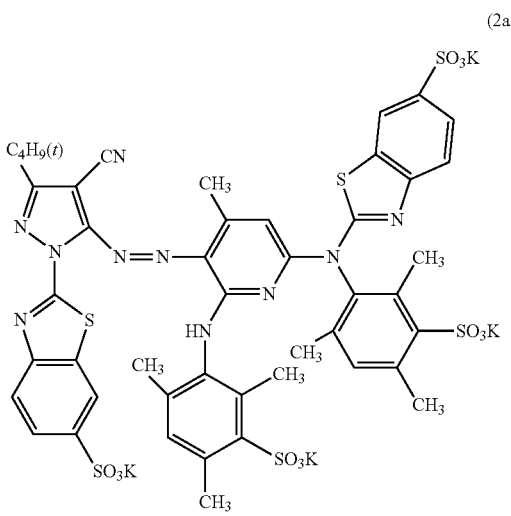

(2a-E)

The compound represented by the chemical formula (2a-E) is yet another embodiment, where in the general formula (2a), $R_1$ is a tert-butyl group; $R_2$ is a cyano group; $R_3$ and $R_4$ each are a 6-potassium sulfonate benzothiazole-2-yl group; $R_5$ and $R_6$ each are a 3-potassium sulfonate mesityl group; $R_7$ is a hydrogen atom; $A_1$ is a carbon atom substituted by a methyl group; and $A_2$ is a carbon atom.

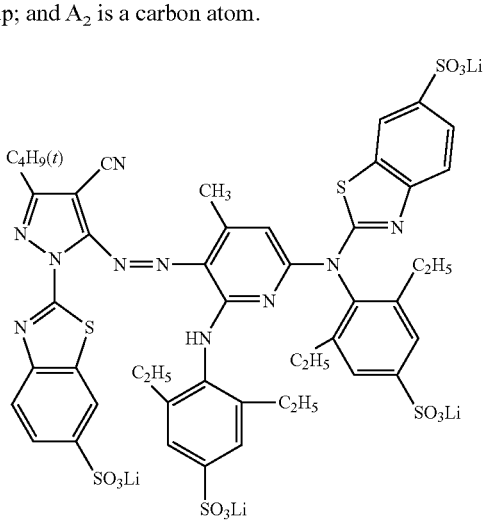

(2a-F)

The compound represented by the chemical formula (2a-F) is yet another embodiment, where in the general formula (2a), $R_1$ is a tert-butyl group; $R_2$ is a cyano group; $R_3$ and $R_4$ each are a 6-lithium sulfonate benzothiazole-2-yl group; $R_5$ and $R_6$ each are a 2,6-diethyl-4-lithium sulfonate phenyl group; $R_7$ is a hydrogen atom; $A_1$ is a carbon atom substituted by a methyl group; and $A_2$ is a carbon atom.

The dye represented by the general formula (2a) may be produced, for example, according to the following steps (A) to (C).

Step (A)

Aminopyrazole represented by the chemical formula (21) is reacted with a diazotizating agent to form a diazonium salt. As the diazotizating agent, a dilute hydrochloric acid solution of sodium nitrite may be employed. In addition, isopentyl nitrite, nitrosylsulfuric acid, and the like may also be employed.

(21)

Each of the substituents $R_1$ and $R_2$ in the chemical formula (21) is the same as that described for the general formula (2a). The aminopyrazole represented by the chemical formula (21) may be synthesized according to a method described in U.S. Pat. No. 3,336,285; "Heterocycles", 20, 519, (1983); JP 6(1994)-19036 B; and the like.

Step (B)

Next, the diazonium salt formed in the step (A) is reacted with a pyridine-based coupling agent represented by the chemical formula (22) to form a compound represented by the chemical formula (23).

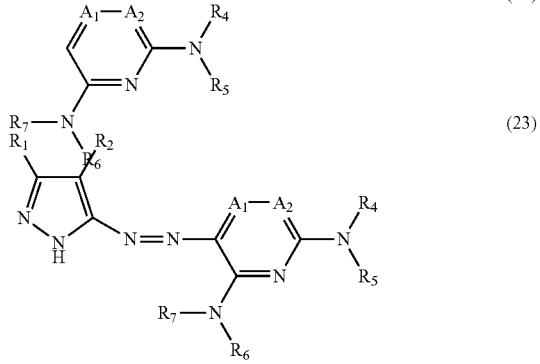

Each of the substituents $R_4$ to $R_7$ in the chemical formula (22) and each of the substituents $R_1$ to $R_7$ in the chemical formula (23) are the same as those described for the general formula (2a). The pyridine-based coupling agent represented by the chemical formula (22) may be synthesized according to a method described in JP 51(1976)-83631 A, JP 49(1974)-74718 A, JP 52(1977)-46230 B, and the like.

Step (C)

The compound formed in the step (B) is reacted with an alkylating agent, an arylating agent or a heterylating agent in the presence of a base, and thereby the dye represented by the general formula (2a) is obtained. As the base employed in this step, an organic base such as diisopropylethylamine or the like; an inorganic base such as potassium carbonate, sodium carbonate, sodium hydrogen carbonate, potassium hydrogen carbonate, sodium hydroxide, potassium hydroxide, or the like; and the like may be employed. The alkylating agent is a compound represented by "R—X". Here, R is an optionally substituted alkyl group. Furthermore, X is a halogen atom or $OSO_2R'$, wherein R' is an alkyl group or an aryl group such as a phenyl group or the like. The arylating agent is a compound represented by "Ar—X". Here, Ar is a phenyl group substituted by an electron attractive group (may be substituted by a substituent having a total Hammett's σp value of 0.2 or more). The heterylating agent is a compound represented by "Het-X". Here, Het is a hetero ring, and examples thereof include a 2-pyridyl group, a 2-thienyl group, a 2-thiazolyl group, a 2-benzothiazolyl group, a triazyl group, a 2-furyl group, and the like.

As described above, in the general formula (2b), r is 0, 1, or 2;

$R_{12}$, $R_{13}$, and $R_{14}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxy group, or a carboxylate ester group, and $R_{12}$, $R_{13}$, and $R_{14}$ may be identical to or different from each other; and $R_{15}$, $R_{16}$, and $R_{17}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and $R_{15}$, $R_{16}$, and $R_{17}$ may be identical to or different from each other.

In the general formula (2b), the substituted or unsubstituted alkyl group in $R_{12}$, $R_{13}$, and $R_{14}$ may be an alkyl group having 1 to 9 carbon atoms in total. Examples of the substituted or unsubstituted alkyl group include a methyl group, an ethyl group, a n-propyl group, an isopropyl group, a n-butyl group, a trifluoromethyl group, a dimethylaminomethyl group, and the like. Examples of a substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (2b), the substituted or unsubstituted alkoxy group in $R_{12}$, $R_{13}$, and $R_{14}$ may be an alkoxy group having 1 to 9 carbon atoms in total. Examples of the substituted or unsubstituted alkoxy group include a methoxy group, an isopropoxy group, a n-butoxy group, and the like.

In the general formula (2b), examples of the halogen atom in $R_{12}$, $R_{13}$, and $R_{14}$ include a fluorine atom, a chlorine atom, a bromine atom, an iodine atom, and the like.

In the general formula (2b), examples of the substituted or unsubstituted carbamoyl group in $R_{12}$, $R_{13}$, and $R_{14}$ include a carbamoyl group, an N,N-dimethylcarbamoyl group, a phenylcarbamoyl group, and the like.

In the general formula (2b), examples of the substituted or unsubstituted sulfamoyl group in $R_{12}$, $R_{13}$, and $R_{14}$ include a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the general formula (2b), examples of the substituted or unsubstituted amino group in $R_{12}$, $R_{13}$, and $R_{14}$ include an N-methylamino group, a carbamoylamino group, an N,N-diethylamino group, an acetylamino group, and the like.

In the general formula (2b), examples of the sulfonate ester group in $R_{12}$, $R_{13}$, and $R_{14}$ include a phenoxysulfonyl group and the like.

In the general formula (2b), the substituted or unsubstituted alkylsulfonyl group in $R_{12}$, $R_{13}$, and $R_{14}$ may be an alkylsulfonyl group having 1 to 9 carbon atoms in total. Examples of the substituted or unsubstituted alkylsulfonyl group include a hydroxysulfonyl group and the like.

In the general formula (2b), the substituted or unsubstituted arylsulfonyl group in $R_{12}$, $R_{13}$, and $R_{14}$ may be an arylsulfonyl group having 6 to 15 carbon atoms in total. Examples of the substituted or unsubstituted arylsulfonyl group include a benzylsulfonyl group and the like.

In the general formula (2b), examples of the carboxylate ester group in $R_{12}$, $R_{13}$, and $R_{14}$ include a methoxycarbonyl group and the like.

In the general formula (2b), the substituted or unsubstituted alkyl group in $R_{15}$, $R_{16}$, and $R_{17}$ may be an alkyl group having 1 to 18 carbon atoms in total. Examples of the substituted or unsubstituted alkyl group include an ethyl group, a n-butyl group, a n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. Examples of a substituent of the substituted alkyl group include a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (2b), the substituted or unsubstituted alkenyl group in $R_{15}$, $R_{16}$, and $R_{17}$ may be an alkenyl group having 2 to 18 carbon atoms in total. Examples of the substituted or unsubstituted alkenyl group include a 2-methyl-1-propenyl group, a vinyl group, an allyl group, and the like.

In the general formula (2b), examples of the substituted or unsubstituted aryl group in $R_{15}$, $R_{16}$, and $R_{17}$ include a 3,4-dicarboxyphenyl group, a 4-butylphenyl group, a 4-carboxyphenyl group, and the like. Examples of a substituent of the substituted aryl group include the same substituents described for the substituted alkyl group.

In the general formula (2b), examples of the substituted or unsubstituted aralkyl group in $R_{15}$, $R_{16}$, and $R_{17}$ include a benzyl group, a 1-carboxy-2-phenyl-ethyl group, a 1-carboxy-2-hydroxyphenylethyl group, a 4-carboxybenzyl group, and the like.

In the general formula (2b), examples of the substituted or unsubstituted alicyclic group in $R_{15}$, $R_{16}$, and $R_{17}$ include a cyclohexyl group, a 4-carboxycyclohexyl group, and the like.

In the general formula (2b), examples of the substituted or unsubstituted heterocyclic group in $R_{15}$, $R_{16}$, and $R_{17}$ include a pyridyl group, a thiadiazolyl group, a benzothiazolyl group, a 2,2,6,6-tetramethylpiperidinyl group, and the like. Examples of a substituent of the substituted heterocyclic group include the same substituents described for the substituted alkyl group.

In the general formula (2b), at least one of $R_{15}$, $R_{16}$, and $R_{17}$ may be an alkyl group, an alkenyl group, an aryl group, an alicyclic group, an aralkyl group, or a heterocyclic group substituted by one to four carboxy groups or sulfamoyl groups.

In the general formula (2b), $R_{15}$ and $R_{16}$ may each be a hydrogen atom or a tri-substituted phenyl group, and $R_{15}$ and $R_{16}$ may be identical to or different from each other. In this instance, three substituents of the tri-substituted phenyl group each are a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

One embodiment of the dye represented by the general formula (2b) is an embodiment where, for example, in the general formula (2b), at least one of $R_{15}$, $R_{16}$, and $R_{17}$ is an alkyl group, an alkenyl group, an aryl group, an aralkyl group, or a cyclohexyl group substituted by one to four carboxy groups or sulfamoyl groups.

With respect to the dye represented by the general formula (2b), the number of sulfonic acid groups, carboxy groups, and/or these salts contained in its structure may be six or less, five or less, and four or less in total. Furthermore, the dye represented by the general formula (2b) may be used in a free acid form. However, when the dye represented by the general formula (2b) is obtained in a salt form at the time of producing, it may be used without conversion or may be converted into a desired salt form. Moreover, with respect to the dye represented by the general formula (2b), a part of the acid groups may be in a salt form, and both a salt-form dye and a free acid-form dye may be present. Examples of such a salt form include salts of alkali metals such as Na, Li, K, and the like; salts of ammonium optionally substituted by an alkyl group or a hydroxyalkyl group; salts of organic amines; and the like. Examples of the organic amine include a lower alkylamine, a hydroxy-substituted lower alkylamine, a carboxy-substituted lower alkylamine, a polyamine having 2 to 10 alkyleneimine units each having 2 to 4 carbon atoms, and the like. The number of the types of these salts used is not limited to 1, but a plurality of types of the salts may be present.

Another embodiment of the dye represented by the general formula (2b) is an embodiment where, for example, in the general formula (2b), r is 0; $R_{12}$ is a carboxy group, a carbamoyl group, a trifluoromethyl group, or a sulfamoyl group; $R_{13}$, $R_{14}$, and $R_{16}$ each are a hydrogen atom; $R_{15}$ is a phenyl group or a carboxy alkyl group optionally substituted by a carboxy group or a sulfamoyl group; and $R_7$ is a hydrogen atom or an alkyl group.

Examples of the dye represented by the general formula (2b) include compounds represented by the following chemical formulae (2b-A) to (2b-E).

(2b-A)

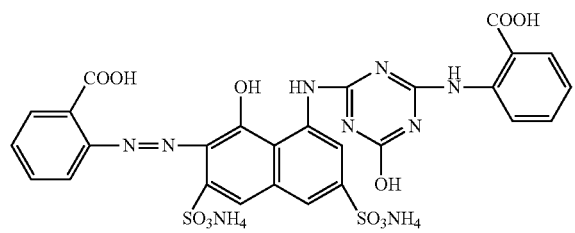

The compound represented by the chemical formula (2b-A) is an embodiment, where in the general formula (2b), r is 0; $R_{12}$ is a carboxy group at the 2-position of a phenyl group bonded to an azo group; $R_{13}$, $R_{14}$ and $R_{16}$ each are a hydrogen atom; $R_{15}$ is a 2-carboxyphenyl group; and $R_{17}$ is a hydrogen atom. In the compound represented by the chemical formula (2b-A), sulfonic acids at the 3-position and 6-position of a naphthalene ring are ammonium salts.

(2b-B)

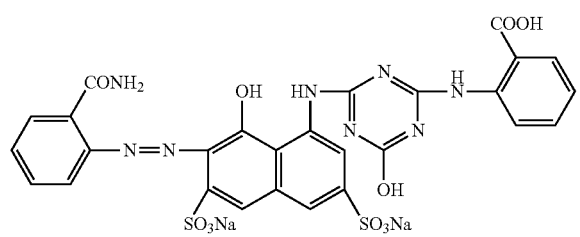

The compound represented by the chemical formula (2b-B) is another embodiment, where in the general formula (2b), r is 0; $R_{12}$ is a carbamoyl group at the 2-position of a phenyl group bonded to an azo group; $R_{13}$, $R_{14}$ and $R_{16}$ each are a hydrogen atom; $R_{15}$ is a 2-carboxyphenyl group; and $R_{17}$ is a hydrogen atom. In the compound represented by the chemical formula (2b-B), sulfonic acids at the 3-position and 6-position of a naphthalene ring are sodium salts.

(2b-C)

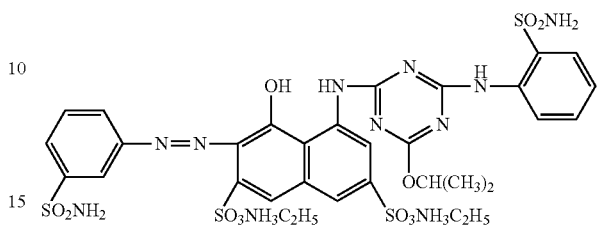

The compound represented by the chemical formula (2b-C) is still another embodiment, where in the general formula (2b), r is 0; $R_{12}$ is a sulfamoyl group at the 3-position of a phenyl group bonded to an azo group; $R_{13}$, $R_{14}$ and $R_{16}$ each are a hydrogen atom; $R_{15}$ is a 2-sulfamoylphenyl group; and $R_{17}$ is an isopropyl group. In the compound represented by the chemical formula (2b-C), sulfonic acids at the 3-position and 6-position of a naphthalene ring are ethylammonium salts.

(2b-D)

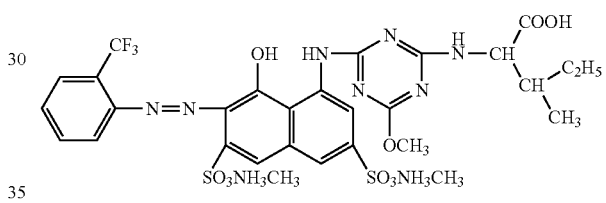

The compound represented by the chemical formula (2b-D) is yet another embodiment, where in the general formula (2b), r is 0; $R_{12}$ is a trifluoromethyl group at the 2-position of a phenyl group bonded to an azo group; $R_{13}$, $R_{14}$ and $R_{16}$ each are a hydrogen atom; $R_{15}$ is a 1-carboxy-2-methylbutyl group; and $R_7$ is a methyl group. In the compound represented by the chemical formula (2b-D), sulfonic acids at the 3-position and 6-position of a naphthalene ring are methylammonium salts.

(2b-E)

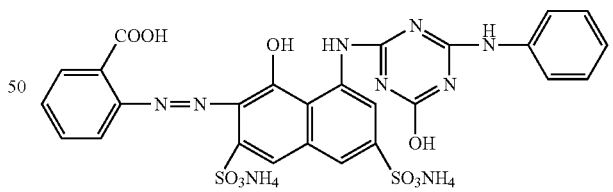

The compound represented by the chemical formula (2b-E) is yet another embodiment, where in the general formula (2b), r is 0; $R_{12}$ is a carboxy group at the 2-position of a phenyl group bonded to an azo group; $R_{13}$, $R_{14}$ and $R_{16}$ each are a hydrogen atom; $R_{15}$ is a phenyl group; and $R_{17}$ is a hydrogen atom. In the compound represented by the chemical formula (2b-E), sulfonic acids at the 3-position and 6-position of a naphthalene ring are ammonium salts.

The dye represented by the general formula (2b) may be produced according to a conventionally known method. For example, the dye represented by the general formula (2b) may be produced according to the following steps (a) to (c).

Step (a)

A monoazo compound is produced from 2-aminobenzoic acid (anthranilic acid) and 1-amino-8-hydroxy-3,6-naphthalenedisulfonic acid (H acid) according a routine method (see, for example, Yutaka Hosoda, SHIN SENRYO KAGAKU (New Dye Chemistry), pp. 396 to 409, published by Gihodo (Dec. 21, 1973)) through diazotization and coupling reaction.

Step (b)

Next, the resultant monoazo compound is added to a cyanuric chloride suspension and allowed to react for several hours. At this time, the reaction mixture is maintained under conditions in which the pH is from about 4 to about 6 and the temperature is from about 0° C. to about 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to a condensation reaction for several hours. Subsequently, an aqueous solution of sodium hydroxide of about 25% is added to the reaction mixture at a temperature from about 50° C. to about 60° C. to make the reaction mixture strong alkaline, thereby effecting a hydrolysis reaction. Thus, the reaction is completed.

Step (c)

After completion of the reaction, the reaction mixture is cooled and is subjected to salting out with sodium chloride, and thereby the dye represented by the general formula (2b) is obtained.

The C. I. Acid Red 1 used for the dye (2) is, for example, a dye represented by the structural formula (2c).

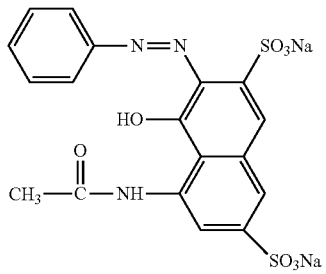

(2c)

The amount of the dye (2) to be added is not particularly limited. By adding the dye (2) to the water-based ink, color developing properties may be improved. Further, when the dye (2) contains the dye represented by the general formula (2a), ozone resistance and light resistance may be improved. When the dye (2) is the dye represented by the general formula (2a), the amount of the dye (2) to be added relative to the amount of the water-based ink is, for example, about 0.1 wt % to about 10 wt %, about 0.8 wt % to about 4.8 wt %, and about 1.0 wt % to about 3.2 wt %. When the dye (2) is at least one dye selected from the group consisting of the dyes represented by the general formula (2b), the amount of the dye (2) to be added relative to the amount of the water-based ink is, for example, about 0.05 wt % to about 5 wt %, about 0.2 wt % to about 1.8 wt %, and about 0.4 wt % to about 1.2 wt %.

When the dye (2) is the dye represented by the general formula (2a), the weight ratio of the dye (1) to the dye (2) in the water-based ink may be about 60:40 to about 20:80 (dye (1):dye (2)). By setting the weight ratio in the aforementioned range, a water-based ink that is excellent in color developing properties and ejection stability is obtained.

When the dye (2) is at least one dye selected from the group consisting of the dyes represented by the general formula (2b), C. I. Acid Red 1, and C. I. Acid Red 254, the weight ratio of the dye (1) to the dye (2) in the water-based ink may be about 70:30 to about 90:10 (dye (1):dye (2)). By setting the weight ratio in the aforementioned range, a water-based ink that is excellent in color developing properties, ozone resistance, and light resistance is obtained.

The total amount of the dye (1) and the dye (2) to be added it not particularly limited. The total amount of the dye (1) and the dye (2) to be added relative to the amount of the water-based ink may be about 2 wt % to about 6 wt %. By setting the total amount of the dye (1) and the dye (2) to be added in the aforementioned range, a water-based ink that is excellent in ejection stability, color developing properties, ozone resistance, and light resistance is obtained.

In addition to the dye (1) and the dye (2), the coloring agent may further contain other dyes and pigments.

The water may be ion-exchange water or pure water. The amount of the water to be added (the proportion of the water in the water-based ink) relative to the amount of the water-based ink is, for example, about 10 wt % to about 90 wt %, and about 40 wt % to about 80 wt %. Alternatively, the amount of the water to be added may be, for example, the balance of the ink, excluding other components.

Examples of the water-soluble organic solvent include a humectant and a penetrant. The humectant prevents a water-based ink from drying at a nozzle tip portion of an ink-jet head, for example. The penetrant adjusts a drying rate of a water-based ink on a recording medium, for example.

The humectant is not particularly limited, and examples thereof include lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone, and the like; ketoalcohols such as diacetone alcohol, and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like. One of the humectants may be used alone or two or more of them may be used in combination. Among them, for example, the humectant may be polyalcohols such as alkylene glycol, glycerin, and the like.

The amount of the humectant to be added relative to the amount of the water-based ink is, for example, 0 wt % to about 95 wt %, about 5 wt % to about 80 wt %, and about 5 wt % to about 50 wt %.

An example of the penetrant includes glycol ether. Examples of the glycol ether include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added relative to the amount of the water-based ink is, for example, 0 wt % to about 20 wt %, about 0.1 wt % to about 15 wt %, and about 0.5 wt % to about 10 wt %.

The water-based ink may further comprise a conventionally known additive(s), if necessary. Examples of the additive include a surfactant, a pH adjuster, a viscosity modifier, a surface tension modifier, a mildewproofing agent, and the like. Examples of the viscosity modifier include polyvinyl alcohol, cellulose, a water-soluble resin, and the like.

The water-based ink may be prepared, for example, by uniformly mixing the coloring agent, water, the water-soluble organic solvent, and optionally other added components by a conventionally known method, and then removing sediments with a filter or the like.

The water-based ink may be used, for example, as a water-based magenta ink. The water-based ink may be used as a water-based ink of other than magenta by using a coloring agent other than the dye (1) and the dye (2).

Next, the ink cartridge is described. The ink cartridge contains a water-based ink for ink-jet recording, and the water-based ink is the aforementioned water-based ink for ink-jet recording. As a body of the ink cartridge, for example, a conventionally known body may be used.

Next, the ink-jet recording apparatus is described. The ink-jet recording apparatus comprises an ink storing portion and an ink ejecting unit, and an ink stored in the ink storing portion is ejected by the ink ejecting unit. The ink cartridge is stored in the ink storing portion. Except for this, the ink-jet recording apparatus may have a configuration similar to that of a conventionally known ink-jet recording apparatus, for example.

As shown in FIG. 1, an ink-jet recording apparatus 1 comprises four ink cartridges 2, an ink ejecting unit (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan, and black, respectively. For example, an ink cartridge containing the water-based magenta ink is the aforementioned ink cartridge. The ink-jet head 3 performs recording on a recording medium P such as a recording paper. The head unit 4 is provided with the ink-jet head 3. The four ink cartridges 2 and the head unit 4 are mounted on the carriage 5. The drive unit 6 reciprocates the carriage 5 in a straight line. As the drive unit 6, a conventionally known drive unit may be used (see JP 2008-246821 A, for example). The platen roller 7 extends in the reciprocating direction of the carriage 5 and is arranged so as to face to the ink-jet head 3. The recording includes recording of letters and images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor inks containing, for example, air bubbles trapped inside the ink-jet head 3. As the purge unit 8, a conventionally known purge unit may be used (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after completion of the recording, in order to prevent the inks from drying.

In the ink-jet recording apparatus, the four ink cartridges may be mounted on a plurality of carriages. Alternatively, the four ink cartridges may not be mounted on the carriage, but may be arranged and fixed in the ink-jet recording apparatus. In such an embodiment, for example, the ink cartridges are connected to the head unit mounted on the carriage via a tube or the like, and the inks are supplied to the head unit from the ink cartridges.

Next, a method for ink-jet recording with the water-based ink for ink-jet recording is described. The method for ink-jet recording performs recording with a water-based ink for ink-jet recording. The water-based ink comprises a coloring agent, water, and a water-soluble organic solvent. The coloring agent comprises the dye (1) and the dye (2). The method for ink-jet recording may be performed using the ink-jet recording apparatus shown in FIG. 1.

In the method for ink-jet recording, the dye represented by the general formula (2a) may be used as the dye (2), and the weight ratio of the dye (1) to the dye (2) in the water-based ink may be about 60:40 to about 20:80 (dye (1):dye (2)).

In the method for ink-jet recording, at least one dye selected from the group consisting of the dyes represented by the general formula (2b), C. I. Acid Red 1, and C. I. Acid Red 254 may be used as the dye (2), and the weight ratio of the dye (1) to the dye (2) in the water-based ink may be about 70:30 to about 90:10 (dye (1):dye (2)).

In the method for ink-jet recording, the total amount of the dye (1) and the dye (2) relative to the amount of the water-based ink may be about 2 wt % to about 6 wt %.

EXAMPLES

Next, Examples are described together with Comparative Examples. However, the present invention is neither limited nor restricted by the following Examples or Comparative Examples.

Examples 1 to 37 and Comparative Examples 1 to 17

Water-based inks for ink-jet recording of Examples 1 to 37 and Comparative Examples 1 to 17 were obtained by mixing their ink composition components (Tables 2 to 7) uniformly and then filtering each of the resultant mixtures through a hydrophilic polytetrafluoroethylene (PTFE) type membrane filter (pore diameter: 0.20 μm) manufactured by Toyo Roshi Kaisha, Ltd. In Tables 2 to 7 below, dyes (1-A) to (1-E) are compounds represented by dyes (1-A) to (1-E) in Table 1, respectively, dyes (2a-A) to (2a-E) are compounds represented by the chemical formulae (2a-A) to (2a-E), respectively, and dyes (2b-A) to (2b-E) are compounds represented by the chemical formulae (2b-A) to (2b-E), respectively.

With respect to each of the water-based inks of Examples and Comparative Examples, (a) evaluation of ejection stability, (b) evaluation of color developing properties, (c) evaluation of ozone resistance, (d) evaluation of light resistance, and (e) comprehensive evaluation were made according to the following methods. Samples used for (b) evaluation of color developing properties, (c) evaluation of ozone resistance, and (d) evaluation of light resistance were prepared in the following manner.

First, ink cartridges were filled with the water-based inks of Examples and Comparative Examples, respectively. Next, each of the ink cartridges was attached to a digital multi-function center DCP-385C mounted an ink-jet printer manufactured by Brother Industries, Ltd. Then, each of the gradation samples of the water-based inks was printed on a glossy photo paper BP71GA manufactured by Brother Industries, Ltd.

(a) Evaluation of Ejection Stability

Continuous recording of 100 million dots (approximately 30,000 sheets) was carried out on office paper W (recording paper) manufactured by FUJITSU CoWorCo LIMITED using the digital multi-function center DCP-385C. The result of the continuous recording was evaluated according to the following evaluation criteria. The term "non-ejection" denotes the state where the nozzle of the ink-jet head is clogged and the water-based ink is not ejected. The term "ejection deflection" denotes the state where the nozzle of the ink-jet head is partially clogged and thereby the water-based ink is ejected not perpendicularly to the recording paper but obliquely thereto.

Criteria for Ejection Stability Evaluation

A: Neither non-ejection nor ejection deflection occurred during the continuous recording.
B: Non-ejection and/or ejection deflection occurred to a small extent during the continuous recording but the non-ejection and/or ejection deflection was restored by five purges or fewer.
C: Non-ejection and/or ejection deflection occurred to a large extent during the continuous recording and the non-ejection and/or ejection deflection was not restored by five purges.

(b) Evaluation of Color Developing Properties

Each of the gradation samples was visually observed and evaluated whether or not the magenta color was sufficiently developed according to the following evaluation criteria.

Criteria for Color Developing Properties Evaluation

A: magenta color was sufficiently developed.
B: magenta color was developed.
C: magenta color was not developed.

(c) Evaluation of Ozone Resistance

Among the gradation samples, a patch having an initial OD value of 1.0 was used as an evaluation sample. The OD value was measured with a spectrophotometer, Spectrolino (light source: $D_{65}$; observer: 2°; and status A), manufactured by GretagMacbeth. Using an ozone weather meter, OMS-H, manufactured by SUGA TEST INSTRUMENTS CO., LTD, the patch was allowed to stand for 40 hours under the conditions in which the ozone concentration was 1 ppm, the temperature in the bath was 24° C., and the relative humidity in the bath was 60%. Next, the OD value of the patch after being allowed to stand was measured in the same manner as described above. Then, the OD value decrease rate (%) was determined according to the following equation (I), and the ozone resistance was evaluated according to the following evaluation criteria. The smaller the OD value decrease rate, the less the deterioration in image quality, which means the ozone resistance of the water-based ink is higher.

$$\text{OD value decrease rate (\%)} = \{(X-Y)/X\} \times 100 \quad \text{(I)}$$

X: 1.0 (initial OD value)
Y: OD value after being allowed to stand

Criteria for Ozone Resistance Evaluation

A: OD value decrease rate was not more than 20%.
B: OD value decrease rate was 20% or more but not more than 30%.
C: OD value decrease rate was 30% or more but not more than 40%.
D: OD value decrease rate was 40% or more.

(d) Evaluation of Light Resistance

Among the gradation samples, a patch having an initial OD value of 1.0 was used as an evaluation sample. The OD value was measured with a spectrophotometer, Spectrolino (light source: $D_{65}$; observer: 2°; and status A), manufactured by GretagMacbeth. Using a super xenon weather meter, SX75, manufactured by SUGA TEST INSTRUMENTS CO., LTD, the patch was irradiated with light from a xenon lamp for 100 hours under the conditions in which the temperature in the bath was 23° C., the relative humidity in the bath was 50%, and the illuminance was 81 klx. Next, the OD value of the patch after irradiation was measured in the same manner as described above. Then, the OD value decrease rate (%) was determined according to the following equation (II), and the light resistance was evaluated according to the following evaluation criteria. The smaller the OD value decrease rate, the less the deterioration in image quality, which means the light resistance of the water-based ink is higher.

$$\text{OD value decrease rate (\%)} = \{(X-Y)/X\} \times 100 \quad \text{(II)}$$

X: 1.0 (initial OD value)
Y: OD value after irradiation

Criteria for Light Resistance Evaluation

A: OD value decrease rate was not more than 20%.
B: OD value decrease rate was 20% or more but not more than 30%.
C: OD value decrease rate was 30% or more but not more than 40%.
D: OD value decrease rate was 40% or more.

(e) Comprehensive Evaluation

With respect to the water-based inks of Examples and Comparative Examples, the comprehensive evaluation was made according to the following evaluation criteria based on the results of the evaluations (a) to (d).

Criteria for Comprehensive Evaluation

G: All of the evaluation results were A or B.
NG: The evaluation results contain C and/or D.

The ink compositions and the evaluation results of the water-based inks of Examples and Comparative Examples are summarized in Tables 2 to 7.

TABLE 2

| | | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Ink composition (wt %) | Coloring agent | Dye (1) | Dye (1-A) | 2.8 | — | — | — | — | — | — | 1.0 | — | — |
| | | | Dye (1-B) | — | 2.4 | — | — | — | — | 0.5 | — | — | — |
| | | | Dye (1-C) | — | — | 2.0 | — | — | — | — | — | 3.0 | — |
| | | | Dye (1-D) | — | — | — | 1.6 | — | — | — | — | — | 3.5 |
| | | | Dye (1-E) | — | — | — | — | 0.8 | 0.4 | — | — | — | — |
| | | Dye (2) | Dye (2a-A) | 1.2 | — | — | — | — | — | — | — | 3.0 | — |
| | | | Dye (2a-B) | — | 1.6 | — | — | — | — | — | 1.0 | — | — |

TABLE 2-continued

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
|  | Dye (2a-C) | — | — | 2.0 | — | — | — | — | — | — | 3.5 |
|  | Dye (2a-D) | — | — | — | 2.4 | — | — | 0.5 | — | — | — |
|  | Dye (2a-E) | — | — | — | — | 3.2 | 3.6 | — | — | — | — |
|  | Glycerin | 27.0 | 27.0 | 27.0 | 27.0 | 27.0 | 27.0 | 27.0 | 27.0 | 27.0 | 27.0 |
|  | Dipropylene glycol-n-propyl ether | 2.0 | 2.0 | 2.0 | 2.0 | 2.0 | 2.0 | 2.0 | 2.0 | 2.0 | 2.0 |
|  | OLFIN ® E1010 (*1) | 0.2 | 0.2 | 0.2 | 0.2 | 0.2 | 0.2 | 0.2 | 0.2 | 0.2 | 0.2 |
|  | Water | Balance | Balance | Balance | Balance | Balance | Balance | Balance | Balance | Balance | Balance |
| Ink | Dye (1):Dye (2) (weight ratio) | 70:30 | 60:40 | 50:50 | 40:60 | 20:80 | 10:90 | 50:50 | 50:50 | 50:50 | 50:50 |
|  | Total amount of dyes in ink (wt %) | 4.0 | 4.0 | 4.0 | 4.0 | 4.0 | 4.0 | 1.0 | 2.0 | 6.0 | 7.0 |
| Evaluation | Ejection stability evaluation | A | A | A | A | A | B | A | A | A | B |
|  | Color developing properties evaluation | B | A | A | A | A | A | A | A | A | A |
|  | Ozone resistance evaluation | A | A | A | A | A | A | B | A | A | A |
|  | Light resistance evaluation | A | A | A | A | A | A | B | A | A | A |
|  | Comprehensive evaluation | G | G | G | G | G | G | G | G | G | G |

(*1): Acetylene glycol surfactant (ethylene oxide adduct (10 mol) of diol, Nissin Chemical Industry Co., Ltd.)

TABLE 3

|  |  |  |  | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|---|
| Ink composition (wt %) | Coloring agent | Dye (1) | Dye (1-A) | 3.8 | — | — | — | — | — | — | 4.8 | — |
|  |  |  | Dye (1-B) | — | 3.6 | — | — | — | — | — | — | 5.6 |
|  |  |  | Dye (1-C) | — | — | 3.2 | — | — | 0.8 | — | — | — |
|  |  |  | Dye (1-D) | — | — | — | 2.8 | — | — | 1.6 | — | — |
|  |  |  | Dye (1-E) | — | — | — | — | 2.4 | — | — | — | — |
|  |  | Dye (2) | Dye (2b-A) | 0.2 | — | — | — | — | — | 0.4 | — | — |
|  |  |  | Dye (2b-B) | — | 0.4 | — | — | — | — | — | 1.2 | — |
|  |  |  | Dye (2b-C) | — | — | 0.8 | — | — | 0.2 | — | — | — |
|  |  |  | Dye (2b-D) | — | — | — | 1.2 | — | — | — | — | 1.4 |
|  |  |  | Dye (2b-E) | — | — | — | — | 1.6 | — | — | — | — |
|  | Glycerin |  |  | 27.0 | 27.0 | 27.0 | 27.0 | 27.0 | 27.0 | 27.0 | 27.0 | 27.0 |
|  | Dipropylene glycol-n-propyl ether |  |  | 2.0 | 2.0 | 2.0 | 2.0 | 2.0 | 2.0 | 2.0 | 2.0 | 2.0 |
|  | OLFIN ® E1010 (*1) |  |  | 0.2 | 0.2 | 0.2 | 0.2 | 0.2 | 0.2 | 0.2 | 0.2 | 0.2 |
|  | Water |  |  | Balance | Balance | Balance | Balance | Balance | Balance | Balance | Balance | Balance |
| Ink | Dye (1):Dye (2) (weight ratio) |  |  | 95:5 | 90:10 | 80:20 | 70:30 | 60:40 | 80:20 | 80:20 | 80:20 | 80:20 |
|  | Total amount of dyes in ink (wt %) |  |  | 4.0 | 4.0 | 4.0 | 4.0 | 4.0 | 1.0 | 2.0 | 6.0 | 7.0 |
| Evaluation | Ejection stability evaluation |  |  | A | A | A | A | A | A | A | A | B |
|  | Color developing properties evaluation |  |  | B | A | A | A | A | A | A | A | A |
|  | Ozone resistance evaluation |  |  | A | A | A | A | B | B | A | A | A |
|  | Light resistance evaluation |  |  | A | A | A | A | B | B | A | A | A |
|  | Comprehensive evaluation |  |  | G | G | G | G | G | G | G | G | G |

(*1): Acetylene glycol surfactant (ethylene oxide adduct (10 mol) of diol, Nissin Chemical Industry Co., Ltd.)

TABLE 4

|  |  |  |  | Ex. 20 | Ex. 21 | Ex. 22 | Ex. 23 | Ex. 24 | Ex. 25 | Ex. 26 | Ex. 27 | Ex. 28 |
|---|---|---|---|---|---|---|---|---|---|---|---|---|
| Ink composition (wt %) | Coloring agent | Dye (1) | Dye (1-A) | 3.8 | — | — | — | — | — | — | 4.8 | — |
|  |  |  | Dye (1-B) | — | 3.6 | — | — | — | — | — | — | 5.6 |
|  |  |  | Dye (1-C) | — | — | 3.2 | — | — | 0.8 | — | — | — |
|  |  |  | Dye (1-D) | — | — | — | 2.8 | — | — | 1.6 | — | — |
|  |  |  | Dye (1-E) | — | — | — | — | 2.4 | — | — | — | — |
|  |  | Dye (2) | C.I. Acid Red 1 | 0.2 | 0.4 | 0.8 | 1.2 | 1.6 | 0.2 | 0.4 | 1.2 | 1.4 |
|  | Glycerin |  |  | 27.0 | 27.0 | 27.0 | 27.0 | 27.0 | 27.0 | 27.0 | 27.0 | 27.0 |
|  | Dipropylene glycol-n-propyl ether |  |  | 2.0 | 2.0 | 2.0 | 2.0 | 2.0 | 2.0 | 2.0 | 2.0 | 2.0 |
|  | OLFIN ® E1010 (*1) |  |  | 0.2 | 0.2 | 0.2 | 0.2 | 0.2 | 0.2 | 0.2 | 0.2 | 0.2 |
|  | Water |  |  | Balance | Balance | Balance | Balance | Balance | Balance | Balance | Balance | Balance |
| Ink | Dye (1):Dye (2) (weight ratio) |  |  | 95:5 | 90:10 | 80:20 | 70:30 | 60:40 | 80:20 | 80:20 | 80:20 | 80:20 |
|  | Total amount of dyes in ink (wt %) |  |  | 4.0 | 4.0 | 4.0 | 4.0 | 4.0 | 1.0 | 2.0 | 6.0 | 7.0 |
| Evaluation | Ejection stability evaluation |  |  | A | A | A | A | A | A | A | A | B |
|  | Color developing properties evaluation |  |  | B | A | A | A | A | A | A | A | A |
|  | Ozone resistance evaluation |  |  | A | A | A | B | B | A | A | A | A |
|  | Light resistance evaluation |  |  | A | A | A | B | B | A | A | A | A |
|  | Comprehensive evaluation |  |  | G | G | G | G | G | G | G | G | G |

(*1): Acetylene glycol surfactant (ethylene oxide adduct (10 mol) of diol, Nissin Chemical Industry Co., Ltd.)

TABLE 5

|  |  |  |  | Ex. 29 | Ex. 30 | Ex. 31 | Ex. 32 | Ex. 33 | Ex. 34 | Ex. 35 | Ex. 36 | Ex. 37 |
|---|---|---|---|---|---|---|---|---|---|---|---|---|
| Ink composition (wt %) | Coloring agent | Dye (1) | Dye (1-A) | 3.8 | — | — | — | — | — | — | 4.8 | — |
|  |  |  | Dye (1-B) | — | 3.6 | — | — | — | — | — | — | 5.6 |
|  |  |  | Dye (1-C) | — | — | 3.2 | — | — | 0.8 | — | — | — |
|  |  |  | Dye (1-D) | — | — | — | 2.8 | — | — | 1.6 | — | — |
|  |  |  | Dye (1-E) | — | — | — | — | 2.4 | — | — | — | — |
|  |  | Dye (2) | C.I. Acid Red 254 | 0.2 | 0.4 | 0.8 | 1.2 | 1.6 | 0.2 | 0.4 | 1.2 | 1.4 |
|  | Glycerin |  |  | 27.0 | 27.0 | 27.0 | 27.0 | 27.0 | 27.0 | 27.0 | 27.0 | 27.0 |
|  | Dipropylene glycol-n-propyl ether |  |  | 2.0 | 2.0 | 2.0 | 2.0 | 2.0 | 2.0 | 2.0 | 2.0 | 2.0 |
|  | OLFIN ® E1010 (*1) |  |  | 0.2 | 0.2 | 0.2 | 0.2 | 0.2 | 0.2 | 0.2 | 0.2 | 0.2 |
|  | Water |  |  | Balance | Balance | Balance | Balance | Balance | Balance | Balance | Balance | Balance |
| Ink | Dye (1):Dye (2) (weight ratio) |  |  | 95:5 | 90:10 | 80:20 | 70:30 | 60:40 | 80:20 | 80:20 | 80:20 | 80:20 |
|  | Total amount of dyes in ink (wt %) |  |  | 4.0 | 4.0 | 4.0 | 4.0 | 4.0 | 1.0 | 2.0 | 6.0 | 7.0 |
| Evaluation | Ejection stability evaluation |  |  | A | A | A | A | A | A | A | A | B |
|  | Color developing properties evaluation |  |  | B | A | A | A | A | A | A | A | A |
|  | Ozone resistance evaluation |  |  | A | A | A | A | B | B | A | A | A |
|  | Light resistance evaluation |  |  | A | A | A | A | B | B | A | A | A |
|  | Comprehensive evaluation |  |  | G | G | G | G | G | G | G | G | G |

(*1): Acetylene glycol surfactant (ethylene oxide adduct (10 mol) of diol, Nissin Chemical Industry Co., Ltd.)

TABLE 6

|  |  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Ink composition (wt %) | Coloring agent | Dye (1) | Dye (1-B) | — | — | 2.0 | — | — | — |
|  |  |  | Dye (1-D) | — | — | — | 2.0 | — | — |
|  |  |  | Dye (1-E) | 4.0 | — | — | — | — | — |
|  |  | Dye (2) | Dye (2a-B) | — | — | — | — | 2.0 | — |
|  |  |  | Dye (2a-C) | — | — | — | — | — | 2.0 |
|  |  |  | Dye (2a-E) | — | 4.0 | — | — | — | — |
|  |  | Comparative dye | C.I. Acid Red 52 | — | — | 2.0 | — | 2.0 | — |
|  |  |  | C.I. Acid Red 289 | — | — | — | 2.0 | — | 2.0 |
|  | Glycerin |  |  | 27.0 | 27.0 | 27.0 | 27.0 | 27.0 | 27.0 |
|  | Dipropylene glycol-n-propyl ether |  |  | 2.0 | 2.0 | 2.0 | 2.0 | 2.0 | 2.0 |
|  | OLFIN ® E1010 (*1) |  |  | 0.2 | 0.2 | 0.2 | 0.2 | 0.2 | 0.2 |
|  | Water |  |  | Balance | Balance | Balance | Balance | Balance | Balance |
| Ink | Dye (1):Dye (2) (weight ratio) (*2) |  |  | 100:0 | 0:100 | 50:50 | 50:50 | 50:50 | 50:50 |
|  | Total amount of dyes in ink (wt %) |  |  | 4.0 | 4.0 | 4.0 | 4.0 | 4.0 | 4.0 |
| Evaluation | Ejection stability evaluation |  |  | A | C | A | A | A | A |
|  | Color developing properties evaluation |  |  | C | A | B | A | A | A |
|  | Ozone resistance evaluation |  |  | A | A | D | D | D | D |
|  | Light resistance evaluation |  |  | A | A | D | D | D | D |
|  | Comprehensive evaluation |  |  | NG | NG | NG | NG | NG | NG |

(*1): Acetylene glycol surfactant (ethylene oxide adduct (10 mol) of diol, Nissin Chemical Industry Co., Ltd.)
(*2): In Comparative Examples 3 and 4, the ratios indicate the weight ratios of the dye (1) to the comparative dye.
In Comparative Examples 5 and 6, the ratios indicate the weight ratios of the dye (2) to the comparative dye.

TABLE 7

|  |  |  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
| Ink composition (wt %) | Coloring agent | Dye (1) | Dye (1-B) | — | 3.2 | — | — | — | — |
|  |  |  | Dye (1-D) | — | — | 3.2 | — | — | — |
|  |  | Dye (2) | Dye (2b-B) | — | — | — | 3.2 | — | — |
|  |  |  | Dye (2b-C) | — | — | — | — | 3.2 | — |
|  |  |  | Dye (2b-E) | 4.0 | — | — | — | — | — |
|  |  |  | C.I. Acid Red 1 | — | — | — | — | — | — |
|  |  |  | C.I. Acid Red 254 | — | — | — | — | — | 4.0 |
|  |  | Comparative dye | C.I. Acid Red 52 | — | 0.8 | — | 0.8 | — | — |
|  |  |  | C.I. Acid Red 289 | — | — | 0.8 | — | 0.8 | — |
|  | Glycerin |  |  | 27.0 | 27.0 | 27.0 | 27.0 | 27.0 | 27.0 |
|  | Dipropylene glycol-n-propyl ether |  |  | 2.0 | 2.0 | 2.0 | 2.0 | 2.0 | 2.0 |
|  | OLFIN ® E1010 (*1) |  |  | 0.2 | 0.2 | 0.2 | 0.2 | 0.2 | 0.2 |
|  | Water |  |  | Balance | Balance | Balance | Balance | Balance | Balance |
| Ink | Dye (1):Dye (2) (weight ratio) |  |  | 0:100 | 80:20 | 80:20 | 80:20 | 80:20 | 0:100 |
|  | Total amount of dyes in ink (wt %) |  |  | 4.0 | 4.0 | 4.0 | 4.0 | 4.0 | 4.0 |
| Evaluation | Ejection stability evaluation |  |  | A | A | A | A | A | A |
|  | Color developing properties evaluation |  |  | A | B | A | A | A | A |

TABLE 7-continued

| | | | | Comp. Ex. 13 | Comp. Ex. 14 | Comp. Ex. 15 | Comp. Ex. 16 | Comp. Ex. 17 |
|---|---|---|---|---|---|---|---|---|
| | Ozone resistance evaluation | | | C | C | C | D | D | C |
| | Light resistance evaluation | | | C | C | C | D | D | C |
| | Comprehensive evaluation | | | NG | NG | NG | NG | NG | NG |
| Ink composition (wt %) | Coloring agent | Dye (1) | Dye (1-B) | — | — | — | — | — |
| | | | Dye (1-D) | — | — | — | — | — |
| | | Dye (2) | Dye (2b-B) | — | — | — | — | — |
| | | | Dye (2b-C) | — | — | — | — | — |
| | | | Dye (2b-E) | — | — | — | — | — |
| | | | C.I. Acid Red 1 | 3.2 | 3.2 | — | — | — |
| | | | C.I. Acid Red 254 | — | — | 4.0 | 3.2 | 3.2 |
| | | Comparative dye | C.I. Acid Red 52 | 0.8 | — | — | 0.8 | — |
| | | | C.I. Acid Red 289 | — | 0.8 | — | — | 0.8 |
| | Glycerin | | | 27.0 | 27.0 | 27.0 | 27.0 | 27.0 |
| | Dipropylene glycol-n-propyl ether | | | 2.0 | 2.0 | 2.0 | 2.0 | 2.0 |
| | OLFIN ® E1010 (*1) | | | 0.2 | 0.2 | 0.2 | 0.2 | 0.2 |
| | Water | | | Balance | Balance | Balance | Balance | Balance |
| Ink | Dye (1):Dye (2) (weight ratio) | | | 80:20 | 80:20 | 0:100 | 80:20 | 80:20 |
| | Total amount of dyes in ink (wt %) | | | 4.0 | 4.0 | 4.0 | 4.0 | 4.0 |
| Evaluation | Ejection stability evaluation | | | A | A | A | A | A |
| | Color developing properties evaluation | | | A | A | A | A | A |
| | Ozone resistance evaluation | | | D | D | C | D | D |
| | Light resistance evaluation | | | D | D | C | D | D |
| | Comprehensive evaluation | | | NG | NG | NG | NG | NG |

(*1): Acetylene glycol surfactant (ethylene oxide adduct (10 mol) of diol, Nissin Chemical Industry Co., Ltd.)
(*2): In Comparative Examples 8 and 9, the ratios indicate the weight ratios of the dye (1) to the comparative dye.
In Comparative Examples 10 to 17, the ratios indicate the weight ratios of the dye (2) to the comparative dye.

As summarized in Table 2, the water-based inks of Examples 1 to 10, in which the dye (1) and the dye (2) (the dye represented by the general formula (2a)) were used in combination, showed favorable results in all the evaluations. With respect to the water-based inks of Examples 1 to 6 each having a different weight ratio of the dye (1) to the dye (2), the water-based inks of Examples 2 to 5, in which Dye (1):Dye (2)=60:40 to 20:80 (weight ratio), showed excellent results in the ejection stability evaluation and the color developing properties evaluation. With respect to the water-based inks of Examples 7 to 10 each having a different total amount of dyes to be added, the water-based inks of Examples 8 and 9, in which the total amount of dyes to be added is 2 wt % to 6 wt %, showed excellent results in the ejection stability evaluation, the ozone resistance evaluation, and the light resistance evaluation.

As summarized in Table 3, the water-based inks of Examples 11 to 19, in which the dye (1) and the dye (2) (the dye represented by the general formula (2b)) were used in combination, showed favorable results in all the evaluations. With respect to the water-based inks of Examples 11 to 15 each having a different weight ratio of the dye (1) to the dye (2), the water-based inks of Examples 12 to 14, in which Dye (1):Dye (2)=70:30 to 90:10 (weight ratio), showed excellent results in the color developing properties evaluation, the ozone resistance evaluation, and the light resistance evaluation. With respect to the water-based inks of Examples 16 to 19 each having a different total amount of dyes to be added, the water-based inks of Examples 17 and 18, in which the total amount of dyes to be added is 2 wt % to 6 wt %, showed excellent results in the ejection stability evaluation, the ozone resistance evaluation, and the light resistance evaluation.

As summarized in Table 4, the water-based inks of Examples 20 to 28, in which the dye (1) and the dye (2) (C. I. Acid Red 1) were used in combination, showed favorable results in all the evaluations. With respect to the water-based inks of Examples 20 to 24 each having a different weight ratio of the dye (1) to the dye (2), the water-based inks of Examples 21 to 23, in which Dye (1):Dye (2)=70:30 to 90:10 (weight ratio), showed excellent results in the color developing properties evaluation, the ozone resistance evaluation, and the light resistance evaluation. With respect to the water-based inks of Examples 25 to 28 each having a different total amount of dyes to be added, the water-based inks of Examples 26 and 27, in which the total amount of dyes to be added is 2 wt % to 6 wt %, showed excellent results in the ejection stability evaluation, the ozone resistance evaluation, and the light resistance evaluation.

As summarized in Table 5, the water-based inks of Examples 29 to 37, in which the dye (1) and the dye (2) (C. I. Acid Red 254) were used in combination, showed favorable results in all the evaluations. With respect to the water-based inks of Examples 29 to 33 each having a different weight ratio of the dye (1) to the dye (2), the water-based inks of Examples 30 to 32, in which Dye (1):Dye (2)=70:30 to 90:10 (weight ratio), showed excellent results in the color developing properties evaluation, the ozone resistance evaluation, and the light resistance evaluation. With respect to the water-based inks of Examples 34 to 37 each having a different total amount of dyes to be added, the water-based inks of Examples 35 and 36, in which the total amount of dyes to be added is 2 wt % to 6 wt %, showed excellent results in the ejection stability evaluation, the ozone resistance evaluation, and the light resistance evaluation.

In contrast, as summarized in Tables 6 and 7, the water-based ink of Comparative Example 1, which does not contain the dye (2), showed an unfavorable result in the color developing properties evaluation. The water-based ink of Comparative Examples 2, 7, 12 and 15, which does not contain the dye (1), showed unfavorable results in the ejection stability evaluation, or the ozone resistance evaluation and the light resistance evaluation. The water-based ink of Comparative Examples 3 and 8, in which C. I. Acid Red 52 was used instead of the dye (2), showed unfavorable results in the ozone resistance evaluation and the light resistance evaluation. The water-based ink of Comparative Examples 4 and 9, in which C. I. Acid Red 289 was used instead of the dye (2), showed unfavorable results in the ozone resistance evaluation and the light resistance evaluation. The water-based ink of Comparative Examples 5, 10, 13 and 16, in which C. I. Acid Red 52 was used instead of the dye (1), showed poor results in the ozone resistance evaluation and the light resistance evaluation. The water-based ink of Comparative Examples 6, 11, 14 lmd 17, in which C. I. Acid Red 289 was used instead of the dye (1), showed poor results in the ozone resistance evaluation and the light resistance evaluation.

It will be obvious to those having skill in the art that many changes may be made in the above-described details of the particular aspects described herein without departing from the spirit or scope of the invention as defined in the appended claims.

What is claimed is:

1. A water-based ink for ink-jet recording, comprising:
a coloring agent;
water; and
a water-soluble organic solvent, wherein
the coloring agent comprises the following a dye (1) and a dye (2):
dye (1): a dye represented by the general formula (1)
dye (2): at least one dye selected from the group consisting of dyes represented by the general formula (2a), dyes represented by the general formula (2b), C. I. Acid Red 1, and C. I. Acid Red 254

(1)

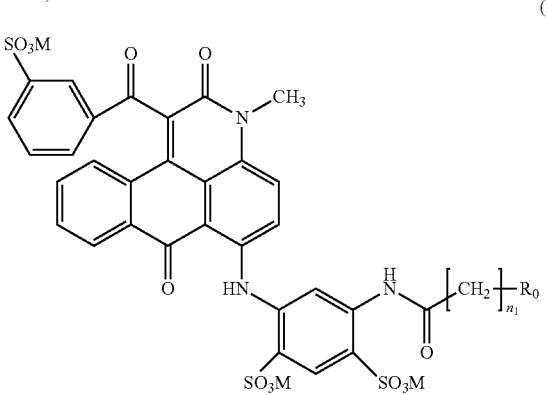

where in the general formula (1),
$n_1$ is 1 or 2;
three Ms each represent sodium or ammonium, and the three Ms may be identical to or different from each other; and
$R_0$ represents a monoalkylamino group having 1 to 8 carbon atoms substituted by a carboxy group, (2a)

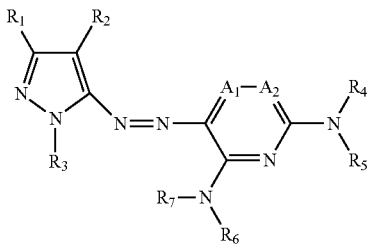

where in the general formula (2a),
$R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, $R_4$, $R_5$, $R_6$, and $R_7$ may be identical to or different from each other, $R_4$ and $R_5$ are not both hydrogen atoms, and $R_6$ and $R_7$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom, (2b)

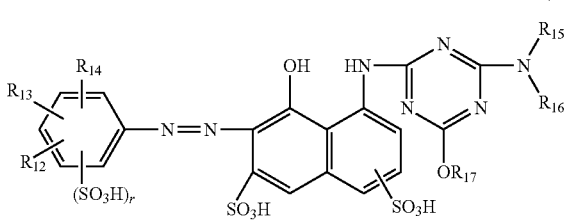

where in the general formula (2b),
r is 0, 1, or 2;

$R_{12}$, $R_{13}$, and $R_{14}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxy group, or a carboxylate ester group, and $R_{12}$, $R_{13}$, and $R_{14}$ may be identical to or different from each other; and $R_{15}$, $R_{16}$, and $R_{17}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and $R_{15}$, $R_{16}$, and $R_{17}$ may be identical to or different from each other.

2. The water-based ink for ink-jet recording according to claim 1, wherein the dye (2) is the dye represented by the general formula (2a), and a weight ratio of the dye (1) to the dye (2) in the water-based ink is about 60:40 to about 20:80 (dye (1):dye (2)).

3. The water-based ink for ink-jet recording according to claim 1, wherein the dye (2) is at least one dye selected from the group consisting of the dyes represented by the general formula (2b), C. I. Acid Red 1, and C. I. Acid Red 254, and a weight ratio of the dye (1) to the dye (2) in the water-based ink is about 70:30 to about 90:10 (dye (1):dye (2)).

4. The water-based ink for ink-jet recording according to claim 1, wherein a total amount of the dye (1) and the dye (2) relative to an amount of the water-based ink is about 2 wt % to about 6 wt %.

5. The water-based ink for ink-jet recording according to claim 1, where in the general formula (2a),
$R_1$ represents an alkyl group;
$R_2$ represents a cyano group;
$R_3$ represents a hydrogen atom, or a substituted or unsubstituted heterocyclic group;
$R_4$ represents a hydrogen atom, a substituted or unsubstituted heterocyclic group, or a substituted aryl group;
$R_5$ and $R_6$ each represent a substituted heterocyclic group, or a substituted aryl group;
$R_7$ represents a hydrogen atom;
$A_1$ represents a substituted carbon atom; and
$A_2$ represents a substituted or unsubstituted carbon atom.

6. The water-based ink for ink-jet recording according to claim 5, where in the general formula (2a),
$R_1$ represents a tert-butyl group;
$R_3$ represents a hydrogen atom, or a benzothiazolyl group optionally substituted by a sulfonic acid group or an alkali metal sulfonate group;
$R_4$ represents a hydrogen atom, a benzothiazolyl group optionally substituted by a sulfonic acid group or an alkali metal sulfonate group, or a trialkylphenyl group substituted by a sulfonic acid group or an alkali metal sulfonate group;
$R_5$ and $R_6$ each represent a monoalkylphenyl group optionally substituted by a sulfonic acid group or an alkali metal sulfonate group, a dialkylphenyl group optionally substituted by a sulfonic acid group or an alkali metal sulfonate group, or a trialkylphenyl group optionally substituted by a sulfonic acid group or an alkali metal sulfonate group, or a benzothiazolyl group substituted by a sulfonic acid group or an alkali metal sulfonate group;
$A_1$ represents a carbon atom substituted by an alkyl group; and
$A_2$ represents a carbon atom optionally substituted by a cyano group.

7. The water-based ink for ink-jet recording according to claim 6, where in the general formula (2a),
$R_3$ represents a hydrogen atom, or a benzothiazole-2-yl group optionally substituted by a sulfonic acid group or an alkali metal sulfonate group;
$R_4$ represents a hydrogen atom, a benzothiazole-2-yl group optionally substituted by a sulfonic acid group or an alkali metal sulfonate group, or a trimethylphenyl group substituted by a sulfonic acid group or an alkali metal sulfonate group;
$R_5$ and $R_6$ each represent a p-octylphenyl group optionally substituted by a sulfonic acid group or an alkali metal sulfonate group, a mesityl group optionally substituted by a sulfonic acid group or an alkali metal sulfonate group, or a benzothiazole-2-yl group substituted by a sulfonic acid group or an alkali metal sulfonate group;
$A_1$ represents a carbon atom substituted by a methyl group; and
$A_2$ represents a carbon atom optionally substituted by a cyano group.

8. The water-based ink for ink-jet recording according to claim 1, where in the general formula (2b),
r is 0;
$R_{12}$ represents a carboxy group, a carbamoyl group, a trifluoromethyl group, or a sulfamoyl group;
$R_{13}$, $R_{14}$, and $R_{16}$ each represent a hydrogen atom;
$R_{15}$ represents a phenyl group optionally substituted by a carboxy group or a sulfamoyl group, or a carboxy alkyl group; and
$R_{17}$ represents a hydrogen atom or an alkyl group.

9. An ink cartridge comprising a water-based ink for ink-jet recording, wherein the water-based ink is the water-based ink for ink-jet recording according to claim 1.

10. An ink-jet recording apparatus, comprising:
an ink storing portion; and
an ink ejecting unit, an ink stored in the ink storing portion being ejected by the ink ejecting unit, wherein
the ink cartridge according to claim 9 is stored in the ink storing portion.

* * * * *